United States Patent [19]

Khariton et al.

[11] Patent Number: 5,687,480

[45] Date of Patent: Nov. 18, 1997

[54] METHOD FOR MOUNTING A SEALED GEARHEAD CONFIGURATION

[75] Inventors: Yefim Khariton, Brooklyn; Avi Telyas, Roslyn Heights, both of N.Y.

[73] Assignee: Bayside Controls, Inc., Port Washington, N.Y.

[21] Appl. No.: 592,866

[22] Filed: Jan. 24, 1996

[51] Int. Cl.$^6$ ............................................. F16H 1/26
[52] U.S. Cl. ........................ 29/893.2; 74/421 A; 74/606 R
[58] Field of Search ........................... 74/421 A, 462, 74/606 R; 384/489, 536, 582; 29/893.1, 893.2

[56] References Cited

U.S. PATENT DOCUMENTS

| | | |
|---|---|---|
| 280,428 | 7/1883 | Wilkinson ............................ 74/462 |
| 1,390,414 | 9/1921 | Wingovist ............................ 74/462 |
| 1,768,225 | 6/1930 | Whitney . | 
| 2,583,140 | 1/1952 | Else . |
| 2,955,487 | 10/1960 | Malley . |
| 3,583,825 | 6/1971 | Sadler et al. . |
| 3,602,070 | 8/1971 | Verge et al. . |
| 4,095,488 | 6/1978 | Nilsson . |
| 4,223,962 | 9/1980 | Zielfleisch ...................... 384/582 X |
| 4,969,371 | 11/1990 | Allen ................................... 74/462 |

FOREIGN PATENT DOCUMENTS

| | | | |
|---|---|---|---|
| 546902 | 10/1959 | Belgium ........................ 384/489 |
| 1400313 | 10/1968 | Germany ....................... 384/536 |
| 602715 | 4/1978 | U.S.S.R. .......................... 74/462 |

*Primary Examiner*—Charles A. Marmor
*Assistant Examiner*—Troy Grabow
*Attorney, Agent, or Firm*—Collard & Roe, P.C.

[57] ABSTRACT

A gearhead with an axially-extending input shaft connected to a motor shaft. A pinion gear and bearing assembly is adapted to connect to the motor shaft. The pinion gear is rotatably and sealably mounted to a recessed mounting surface of the housing to reduce noise, prevent entry of dirt and dust and provide a floating connection. The mounting is achieved with a double-sealed bearing which is configured to float with respect to the housing so that a high tolerance connection is maintained between the pinion gear and the gearhead while accommodating motor shaft misalignment. The invention also relates to a method for mounting the motor shaft onto the gearhead by inserting the motor shaft into the input pinion gear, securing the gearhead to the motor and clamping the input pinion gear to the motor shaft.

2 Claims, 3 Drawing Sheets

Fig. 1 - Prior Art

METHOD FOR MOUNTING A SEALED GEARHEAD CONFIGURATION

BACKGROUND OF THE INVENTION

1. Field of the Invention

The invention relates to a sealed gearhead configuration and method for mounting same to a motor. More particularly, it relates to a sealed gearhead having a floating input pinion sealingly mounted thereon.

2. The prior Art

U.S. Pat. No. 2,583,140 shows a driving pinion connected to a motor shaft and journalled within a ball bearing assembly. The patent discloses an overspeed unit concentric with the driving pinion which is useful when lifting heavy loads. However, such structure is not applicable to gearheads used with servo or stepper motors.

Gearheads for servo and stepper motors are provided with an open input end to accommodate the motor shaft with a pre-mounted input pinion gear. Assembly was time consuming in that the pinion gear had to be accurately positioned during mounting onto the motor shaft. In addition to the pinion/motor shaft alignment and position restraint, the motor pilot rings operated as a second restraint. These factors contributed to a low tolerance engagement between the input pinion and the input spur gear which resulted in unacceptable noise levels and poor reliability during operation. Alignment errors could not be detected until assembly was complete and the motor began running. In addition, since the gearhead had an open end, only stiff greases could be used. These deficiencies adversely affected the assembly and utilization of such components in the field.

SUMMARY OF THE INVENTION

It is therefore an object of the present invention to overcome the drawbacks of the prior art and to provide a sealed gearhead with increased tolerance on the input side while simplifying installation.

It is yet another object of the present invention to provide a sealed gearhead which operates substantially quieter and with improved position tolerance than conventional gearheads.

These and other related objects are achieved according to the invention by a gearhead with an axially-extending pinion gear for connection to a motor shaft. The gearhead comprises a pinion gear and bearing assembly adapted to connect to the motor shaft and a housing with an exterior wall for containing the gearhead. The housing includes an annular mounting surface that is centrally disposed on the exterior wall. The annular mounting surface is recessed within the exterior wall for receiving and retaining the pinion gear and bearing assembly. Sealing means forms a seal between the pinion gear and bearing assembly and the annular mounting surface. The sealing means allows radial movement of the pinion gear with respect to the annular mounting surface so that a high tolerance connection is maintained between the pinion gear and the remainder of the gearhead, while accommodating misalignment of the motor shaft. Motor interface guide rings on the motor are freely aligned with the housing, whereby the pinion gear and motor shaft connection determines the alignment of the motor interface guide rings. The guide rings have a clearance in the range of about 0.001 inch to about 0.002 inch.

The pinion gear and bearing assembly comprises a double-sealed bearing with an internal annular surface press fit onto the pinion and an external annular surface disposed opposite the annular mounting surface of the housing. The annular mounting surface includes a first annular recess disposed therein. The sealing means comprises an O-ring disposed within the first annular recess. The external annular surface slide fits into the annular mounting surface with a gap formed therebetween which is sealed by the O-ring to form a liquid-tight, pivoting or floating connection so that operating noise is reduced and dirt and dust are prevented from entering the housing. The gap is in the range of about 0.0005 inch to about 0.001 inch.

The annular mounting surface includes a second annular recess disposed therein. The sealing means comprises a retaining ring disposed within the second annular recess to retain the double-sealed bearing adjacent the mounting surface. The second annular recess is axially spaced from the first annular recess so that the retaining ring contacts a lateral surface of the double-sealed bearing. The retaining ring is disposed axially between the double-sealed bearing and the motor. The pinion gear includes clamping means for fixedly connecting the pinion gear to the motor shaft. The gearhead includes an input spur gear, wherein the pinion gear and the input spur gear have crown cut teeth The aforementioned objects are further achieved according to the invention by a method for mounting a motor with a shaft onto a gearhead including an input pinion gear comprising the following steps. The motor shaft is inserted into the input pinion gear and the gearhead is secured to the motor whereby the input pinion gear is automatically positioned along the motor shaft. The input pinion gear is then clamped to the motor shaft. The gearhead includes a gearhead pilot ring and the motor includes a motor pilot ring with a 0.001 inch to 0.002 inch clearance between the pilot rings. The gearhead pilot ring engages the motor pilot ring prior to the step of securing the gearhead to the motor with the input pinion gear and motor shaft connection determining the alignment between the pilot rings. The step of clamping comprises tightening a bolt on a split-ring collar portion of the input pinion gear. The bolt is oriented transverse to the motor shaft.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
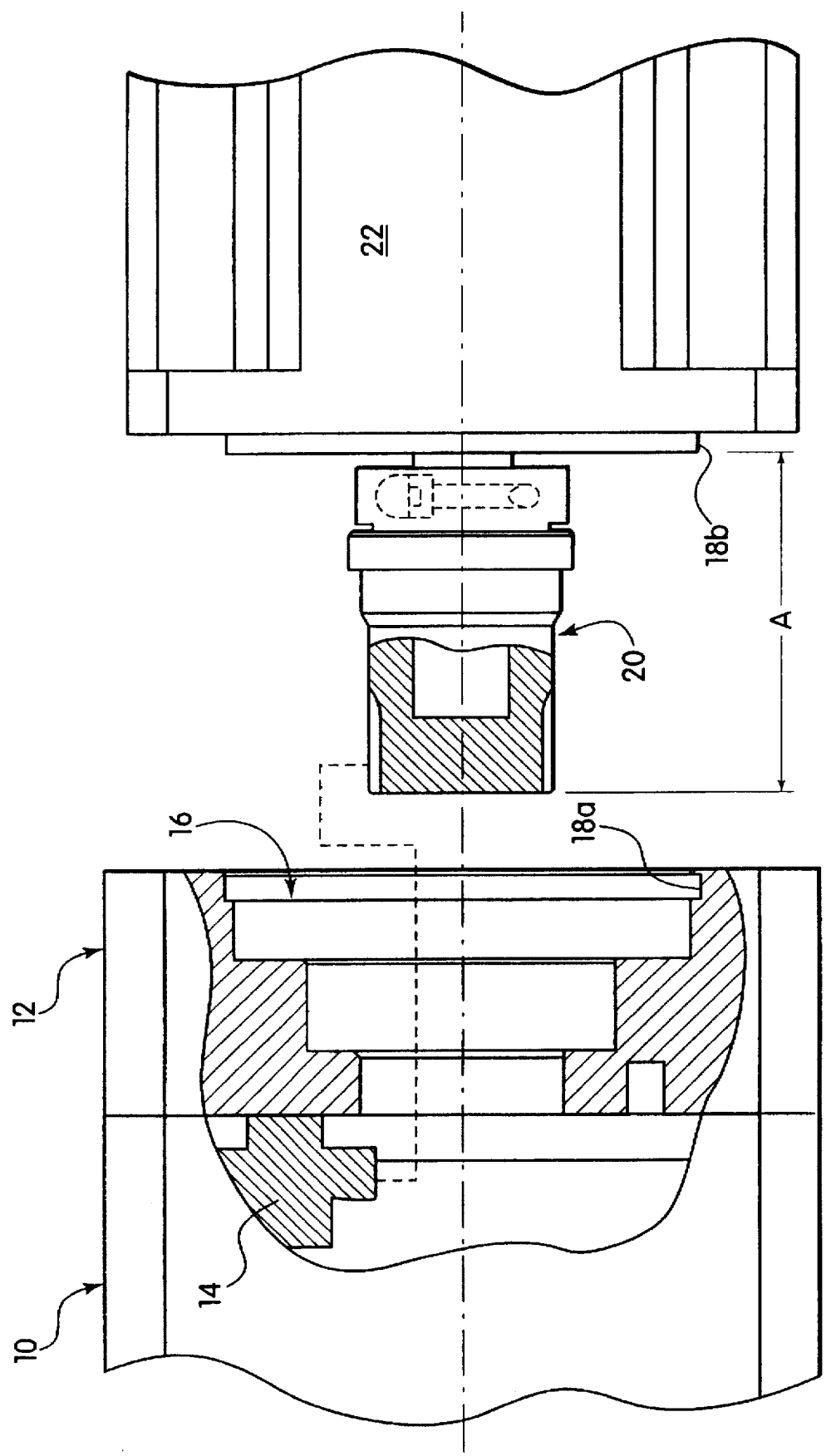
FIG. 1 is a side-elevational view, in part cross section, showing a prior art open gearhead for mounting onto a motor.

Referring now in detail to the drawings and, in particular, FIG. 1, there is shown a prior art open gearhead 10 equipped with a mounting plate 12 and an input spur gear 14. Gearhead 10 is coupled to a motor 22 having an axle 24 fitted with a clamp-on pinion 20. Clamp-on pinion 20 is inserted into an open input end 16 of gearhead 10 for engaging input spur gear 14. The first restraint with the prior art configuration is that pinion 20 must be properly measured and positioned onto axle 24. The second restraint consists of pilot rings 18a and 18b which must be aligned when bolting motor 22 onto gearhead 10. Accordingly, misalignment of axle 24 or other problems effecting the engagement of pinion 20 with spur gear 14 will not become apparent until final assembly, when motor 22 is bolted to gearhead 10. At this point, the entire assembly is positioned internally of the housing and hidden from view. The alignment errors will only be apparent upon starting the motor wherein the misalignment will be detected by the noise as the misaligned pinion 20 grinds against gear 14. In order to correct the misalignment, motor 22 must be completely disassembled from gearhead 10 to access the internal parts. Furthermore, because gearhead 10 has an open input end 16, only stiff greases can be used to lubricate the internal components of gearhead 10.

Figure 2:
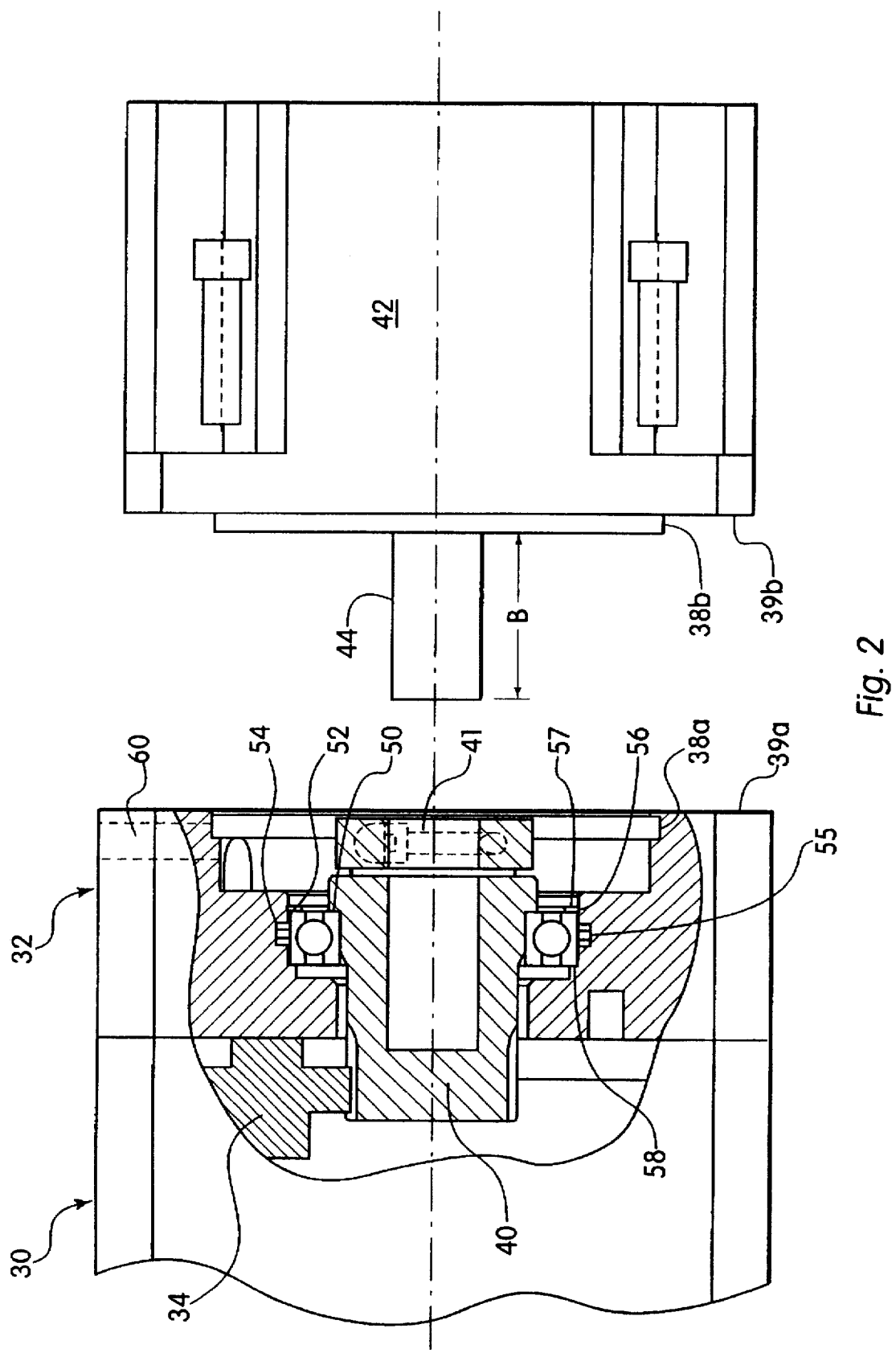
FIG. 2 is a side-elevational view, in part cross section, showing a sealed gearhead according to the invention.

Referring now to FIG. 2, there is shown an embodiment of the invention with an input pinion 40 which is rotatably secured to mounting plate 32 of sealed gearhead 30. By pre-mounting input pinion 40 to mounting plate 32 instead of a motor shaft, a high tolerance engagement between input pinion 40 and input spur gear 34 is achieved. By increasing the tolerance of this engagement, the precision or backlash of the gearhead is improved while the operating noise is reduced.

Input pinion 40 is rotatably coupled to mounting plate 32 via bearing 50 to form a liquid seal on gearhead 30. This liquid seal allows any type of lubricant, including fluid lubricant, to be used, in any amount. This liquid seal also prevents dirt and dust from entering gearhead 30. By eliminating the introduction of foreign particles into gearhead 30 and by providing adequate lubrication, the operating noise is further reduced. Finally, the liquid seal acts as a physical barrier to block operating noise from within gearhead 30. Surprisingly, it was discovered that the combined benefits of the liquid seal resulted in a reduced operating noise level at about 4,000 rpm, of 4–10 dB, compared with similar prior art gearheads.

Typically, motors 22 and 42 are low tolerance components. In the prior art configuration of FIG. 1, a position error caused by angular misalignment of motor shaft 24 integrates a position error over the entire length A of motor shaft 24. The resulting position error at the free end of motor shaft 24 affects the operation of gear 14 and gearhead 10 which is a high tolerance component. In contrast thereto, the configuration according to the invention shown in FIG. 2, constrains radial movement of input pinion 40 with bearing 50. Accordingly, position error caused by angular misalignment of motor shaft 44 only integrates over a distance B. In addition, the invention provides significant advantages in raising and thus avoiding the critical speed of the rotating motor shaft. Critical speeds depend upon the magnitude or location of the load carried by the shaft, the length of the shaft, its diameter and the kind of supporting bearings. The factors which can be controlled after a particular maximum length is determined are method of bearing support and choice of shaft diameter. Vibration due to high-speed rotation reduces dramatically when bearing 50 is supplied to the free end of shaft 44 compared to the unsupported free end of shaft 24.

Bearing 50 is press fit onto input pinion 40. Bearing 50 is then mounted onto mounting plate 32 with a slide fit. Accordingly, a clearance between bearing 50 and a gearhead mounting surface 52 is present. Such clearance is in the range of about 0.0005 inches to 0.001 inches. An O-ring 55 is disposed within a first recess 54 to resiliently support bearing 50. Accordingly, bearing 50 is capable of slight radial, pivoting or floating motion against the cushioning effect of O-ring 55. A retaining clip 57 is disposed within a second recess 56 to prevent bearing 50 from sliding axially outwardly from gearhead 30. A shoulder 58 prevents axial displacement inwardly of bearing 50.

An aperture 60 extends radially through mounting plate 32 allowing access to a bolt 41 located on a split ring portion of input pinion 40. During assembly, motor shaft 44 slides into input pinion 40 until motor interface guide rings or pilot rings 38a and 38b matingly engage with a slide fit. The slide fit has a clearance in the range of about 0.001 inch to about 0.002 inch. The pinion gear/motor shaft connection determines the alignment of the motor interface guide rings. The flanged surfaces 39a and 39b should be completely flush for proper installation. However, any excessive misalignment of shaft 44 becomes immediately apparent by gaps formed between flanged surfaces 39a and 39b. Since any misalignment is immediately apparent at the beginning of the installation process, corrective steps can easily be taken. For example, shims can be inserted into the gap between the flanged surfaces so that the misalignment is corrected during the assembly process. In addition, gross misalignment is identifiable to replace worn or damaged parts at the outset of the assembly process.

Once motor 42 is rigidly supported against mounting plate 32, for example, by peripherally-spaced bolts, input pinion 40 is secured to motor shaft 44. Significantly, input pinion 40 is automatically positioned along motor shaft 44 once motor 42 is bolted into position. A tool is inserted through aperture 60 to tighten bolt 41 so that the split collar portion of input pinion 40 clamps onto shaft 44. The radial play of bearing 50, due to the resilient cushioning of O-ring 55, provides tolerance to misalignment of shaft 44. At the same time, the high tolerance engagement between input pinion 40 and spur gear 34 is maintained. As a result, the tolerance to motor shaft misalignment increases while the noise level decreases. In addition, the increased tolerance between input pinion 40 and spur gear 34 reduces backlash, i.e., lost motion between the input and output of the gearhead.

Figure 3:
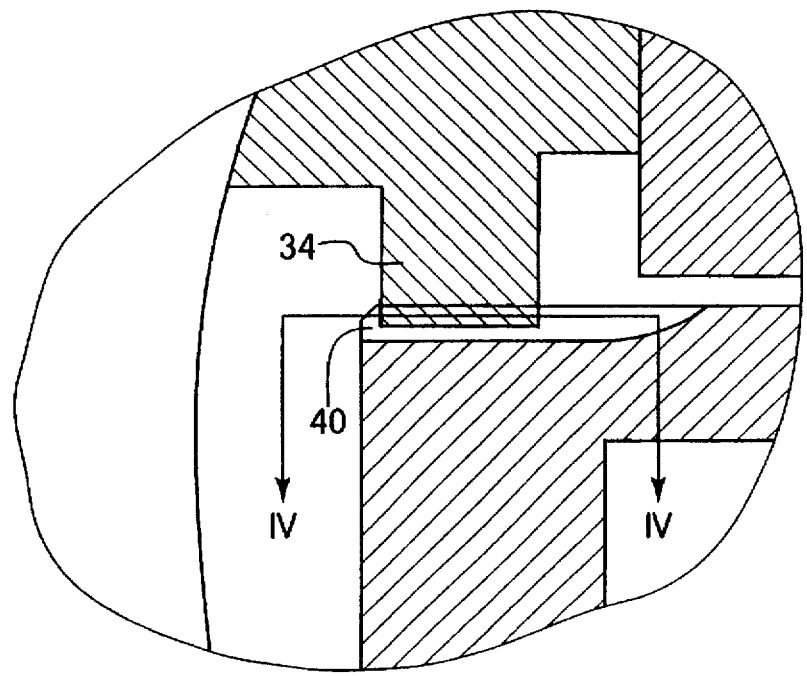
FIG. 3 is an enlarged view of the input gears.
Figure 4A:
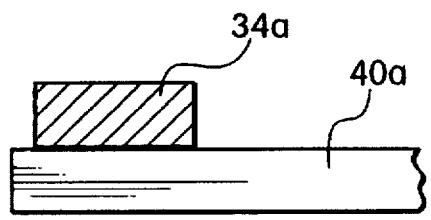
FIGS. 4A, 4B, 4C and 4D are a series of cross-sectional views taken along the line IV—IV from FIG. 3.

Misalignment of shaft 44 causes input pinion 40 to pivotally deviate from the longitudinally-extending center line of the motor shaft. FIG. 3 is an enlarged view of input pinion 40, which meshes with spur gear 34 which rotates about a fixed, non-pivoting axis. The engagement of two gears, one with a fixed axis and one with a potentially pivoting axis, may lead to excessive noise and wear. The exact cause of these problems can be most easily seen in FIGS. 4A, 4B, 4C and 4D. FIG. 4A shows spur gear 34a and input pinion 40a with standard teeth having parallel-cut edges where they engage each other. Theoretically, the standard teeth would contact each other across the entire engagement surface. However, since at least some misalignment always exists, the standard teeth only contact each other at one corner edge, as shown by gears 34b and 40b in FIG. 4B. This causes weakness under load and excessive noise.

Figure 4C:
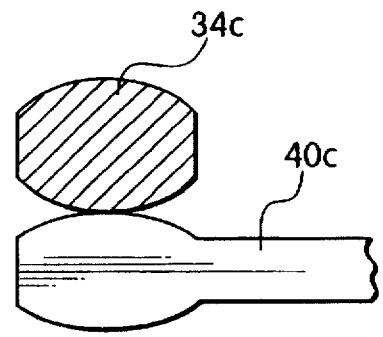
Figure 4B:
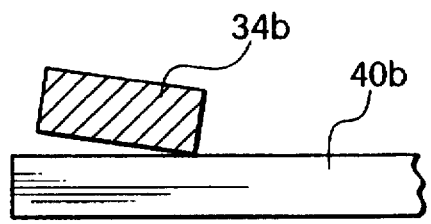
Figure 4D:
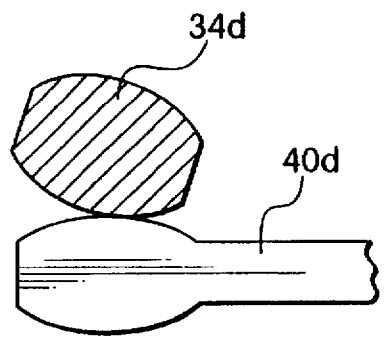

FIGS. 4C and 4D show crown cut teeth in which the chordal thickness of the tooth varies along its axis. The resulting contact bearing is always near the center of the gear, instead of at one extreme end. FIG. 4C shows a theoretically-perfect alignment where the crown cut teeth of gears 34c and 40c engage at their centers. As mentioned above, at least some misalignment exists in any gear train. By crowning, the gear misalignment problems caused by various factors can be minimized. Since the actual gear contact point can vary around the theoretical center contact point, manufacturing and design flaws have less effect, backlash requirements may be reduced and the gears can wear in rather than wear out. Comparing the slight misalignment from FIGS. 4B and 4D, the crown cut teeth in FIG. 4D still maintain a point of contact relatively near the center point. The crown cut teeth have increased strength and reduced noise output since the crown teeth readily roll to their contact point which is near the center. In contrast, the straight-cut teeth result in excessive noise and wear as the teeth slam into a corner-edge contact position, as shown in FIG. 4B. The combination of resilient cushioning by O-ring 55 and crown cut teeth on gears 34d and 40d, results in a tolerance to motor shaft misalignment and decreased noise level which are significantly improved from prior art gearhead configurations.

Accordingly, while only a single embodiment of the present invention has been shown and described, it is obvious that many changes and modifications may be made thereunto without departing from the spirit and scope of the invention.

What is claimed is:

1. A method for mounting a motor with a shaft onto a gearhead including an input pinion gear, comprising the steps of:

inserting the motor shaft into the input pinion gear;

securing the gearhead to the motor, whereby the input pinion gear is automatically positioned along the motor shaft; and clamping the input pinion gear to the motor shaft, wherein the gearhead includes a gearhead pilot ring and the motor includes a motor pilot ring with about 0.001 inch to about 0.002 inch clearance between the gearhead pilot ring and the motor pilot ring, wherein said gearhead pilot ring engages said motor pilot ring prior to said step of securing, with the input pinion gear and motor shaft connection determining the alignment between the gearhead pilot ring and the motor pilot ring.

2. The method according to claim 1, wherein said step of clamping comprises tightening a bolt on a split collar portion of the input pinion gear, wherein the bolt is oriented transverse to the motor shaft.

* * * * *